June 20, 1961 W. H. ESSELMAN ET AL 2,989,453
PRESSURE SYSTEM CONTROL
Filed June 12, 1957 3 Sheets-Sheet 1

June 20, 1961   W. H. ESSELMAN ET AL   2,989,453
PRESSURE SYSTEM CONTROL
Filed June 12, 1957   3 Sheets-Sheet 2

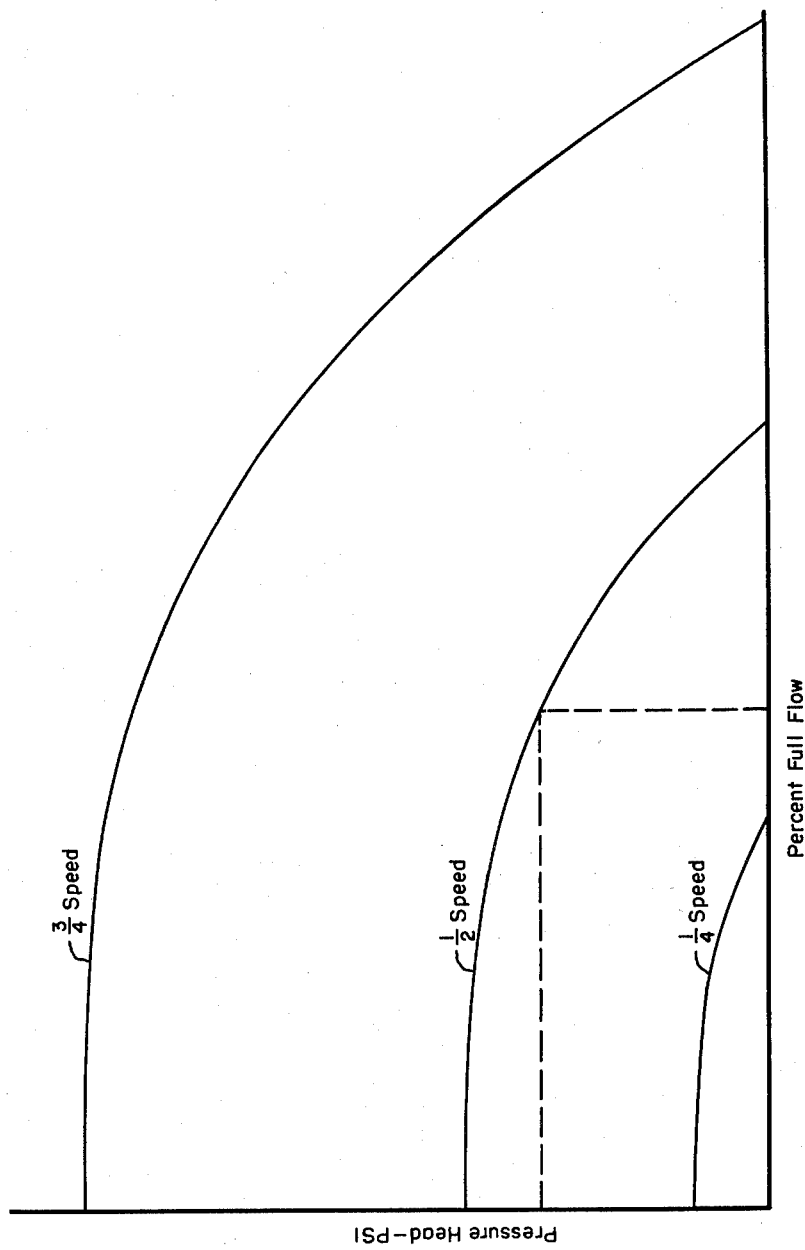

United States Patent Office 2,989,453
Patented June 20, 1961

2,989,453
PRESSURE SYSTEM CONTROL
Walter H. Esselman, Pittsburgh, and George M. Kaplan, Bethel Park, Pa., assignors, by mesne assignments, to the United States of America as represented by the United States Atomic Energy Commission
Filed June 12, 1957, Ser. No. 665,220
5 Claims. (Cl. 204—154.2)

This invention relates generally to pressure systems, and more particularly to means for maintaining and controlling the system pressures.

In many enclosed liquid systems it is desirable to maintain the pressure of the liquid at some super-atmospheric level, such for example as in a pressurized hot water heating system of a building. In such systems a pressurizing means having a fast response time and requiring a minimum of maintenance is very desirable. Other pressure systems in which a pressurizing means is needed to vary pressure with a minimum of inertia, and which means also requires a minimum of maintenance are found in other heat transfer applications, for example, such as the primary coolant and heat transfer loop of neutronic reactors of the liquid cooled type.

In neutronic reactors of the pressurized liquid type it is essential that the coolant fluid in the primary loop of the reactor system be at a temperature above its normal atmospheric boiling point, and such temperatures are achieved by maintaining a higher than atmospheric pressure throughout the closed recirculating primary loop. In the past, the pressure has usually been maintained by the connection of an enclosed pressurizer to one portion of this loop. Such pressurizers are provided with heaters totally immersed in the liquid whereby the liquid can be boiled to create a vapor above the surface of the liquid. The vapor will, in turn, exert a pressure on the liquid in proportion to the temperature of the saturated vapor. The magnitude of the pressure of the primary system is thereby increased by the use of the heaters. Such pressurizers are also provided with spray means which produces a cool liquid spray in the vapor space to condense the vapor in the pressurizer and cause a decreased pressure. Such a method for pressure variation necessarily has a great deal of inertia, and accordingly, following a pressure transient, equilibrium is restored only after a relatively great time lapse. Another disadvantage of present pressurizing means is the necessity of providing the heaters in the pressurizer beneath the liquid level. The presence of these heaters necessitates an additional power supply and additional maintenance problems in the event of heater failure, which can be caused by burnout of the heater elements by low liquid level in the pressurizer. In order to fulfill the requirement that in a pressurizer having heater elements, the heaters under all conditions must be totally immersed in the liquid, the size of such pressurizers is necessarily greater than would be needed without heaters.

Accordingly, the present invention describes a means for maintenance of pressure in pressurized liquid systems by use of a bias pressurizing system having a liquid tap at one portion of the system and a liquid inlet at another portion. The liquid tap may be preferably located on the hot leg of the primary system heat exchanger and the liquid inlet on the cold leg of the heat exchanger. The liquid tap forms an inlet to a storage tank and has a flow restricting means located therein. The storage tank is normally at a lower pressure than the primary system due to operation of a bias pump. The storage tank outlet is connected to the liquid inlet on the cold leg of the primary system through a variable flow pump so that a difference in liquid outlet flow and inlet flow will vary the pressure of the primary system. Such a flow difference is caused by a variation of the speed of the variable flow pump so that a change can be made in the primary system pressure with a high response time. This system also eliminates heaters from the pressurizer tank which, in turn, reduces the size, weight, fabrication and cost of the latter. The elimination of heaters also is advantageous inasmuch as the electrical supply for the heaters is eliminated and the electrical power necessary to operate the pump is much less than that required for heaters. Maintenance problems are also reduced with the elimination of the heaters.

Certain types of neutronic reactors may be controlled by a variation of pressure or temperature within the primary system, and in this type of reactor the load on the reactor is directly proportional to the primary system pressure and temperature. This type of reactor can therefore be controlled in response to temperature or pressure of the reactor primary system. One reactor of this type is commonly referred to as a steam rod reactor and is described and claimed in patent application Serial No. 533,560, filed September 12, 1955, entitled "Reactor" by Walter G. Roman, and assigned to the same assignee as this invention (hereinafter referred to as the Roman application). With the proper type of pressure control, the steam rod reactor can be made quite stable. However, because of an inherently high pressure coefficient of reactivity, this type of reactor is extremely sensitive to small pressure changes and thus requires tighter control of its system pressure than does the conventional pressurized liquid reactor. The desired control cannot be efficiently obtained with an electrically heated type of pressurizer, for such a pressurizer would require a relatively great heater power capacity to provide a very small time lag, as well as increased cold spray capacity in order to properly regulate the system pressure during even a nominal transient.

Inherent characteristics of the steam rod reactor differing from those of conventional pressurized liquid reactors are that its reactivity is more sensitive to changes in pressure at least at a given temperature and the moderator temperature in certain confined areas of the reactor is determined almost entirely by energy dissipated as a result of its moderating action in slowing down neutrons rather than by thermal conduction. Any slight change in the system pressure or moderator temperature causes a relatively great change in moderator density by causing a change to and from liquid and vapor phases in the confined areas of the reactor, as will be hereinafter more fully explained. Since temperature in the confined reactor areas is affected primarily by radiation energy, it becomes a function of reactor power level.

The bias pressurizer uses the high pressure coefficient of reactivity to control reactor power, and to accomplish the latter, the bias control can be used to maintain a constant value of pressure in the primary system or to maintain a constant average coolant temperature throughout all load changes. A steam rod type of reactor is thus completely controllable by the present invention by controlling primary coolant pressure either to maintain the pressure constant, or to maintain the temperature constant.

Accordingly, the principal object of this invention is to provide a simple, easily maintainable means for controlling pressure in a closed loop containing a liquid therein.

Another object of this invention is to provide a simple, easily maintainable means for pressurizing a closed loop containing a liquid therein by providing a bias circuit across the loop having a flow restriction means, a storage tank and a pump connected in series therein.

A more specific object of this invention is to provide means for pressurizing a closed system containing a recirculating liquid coolant and having a heat source and a heat sink therein, by biasing part of the coolant in one location of the system to an external loop having a flow restriction means, a storage tank and a variable speed pump connected in series therein, and by returning another part of the coolant into the recirculating system at another location at a variable flow rate.

Another more specific object of this invention is to provide means for pressurizing a closed system containing a recirculating coolant and having a heat source and heat sink therein by biasing a portion of the heat sink inlet coolant to a bias loop having an orifice, storage tank, and a variable speed pump connected in series therein, which bias loop returns another portion of the coolant into the system on the outlet side of the heat sink in response to a pressure signal from the system.

A still more specific object of this invention is to provide a means for pressurizing the primary loop of a pressurized liquid reactor, which primary loop is provided with a reactor vessel containing a heat source, and also provided with a heat exchanger and a pump for circulating a primary coolant through the loop, by the use of a biasing flow system comprising a flow restriction means, a storage tank and a variable speed biasing pump connected in series therein, which bias flow system causes a portion of the flow into the heat exchanger to pass through the flow restriction means into the storage tank, and then pumps another portion of this biased flow into the primary loop on the output side of the heat exchanger by means of the variable speed pump whose speed is dependent upon a pressure signal from the primary loop.

Another object of this invention is to provide pressurizing means having a fast response for controlling a reactor having a moderator whose moderating ability varies directly with changes in system pressure.

Still another object of this invention is to provide a pressurizing system for the primary loop of a reactor having recirculating coolant as a moderator and whose moderating ability changes with system pressure, by providing a biasing system across the primary loop which biases portions of the coolant flow out of the primary loop into a storage tank by way of a pressure drop device and returns another portion of the coolant from the storage tank to the primary loop by means of a variable speed pump whose speed is dependent upon a temperature signal from the primary loop.

These and other objects and advantages of this invention will be more clearly understood by one skilled in the art to which it appertains from the following detailed description of preferred embodiments of this invention, when taken in connection with the attached drawings, in which:

FIG. 5 is a graph of certain characteristics of a variable speed pump used in the embodiments of the invention, as shown in FIGS. 1, 2 and 4.

Figure 1:
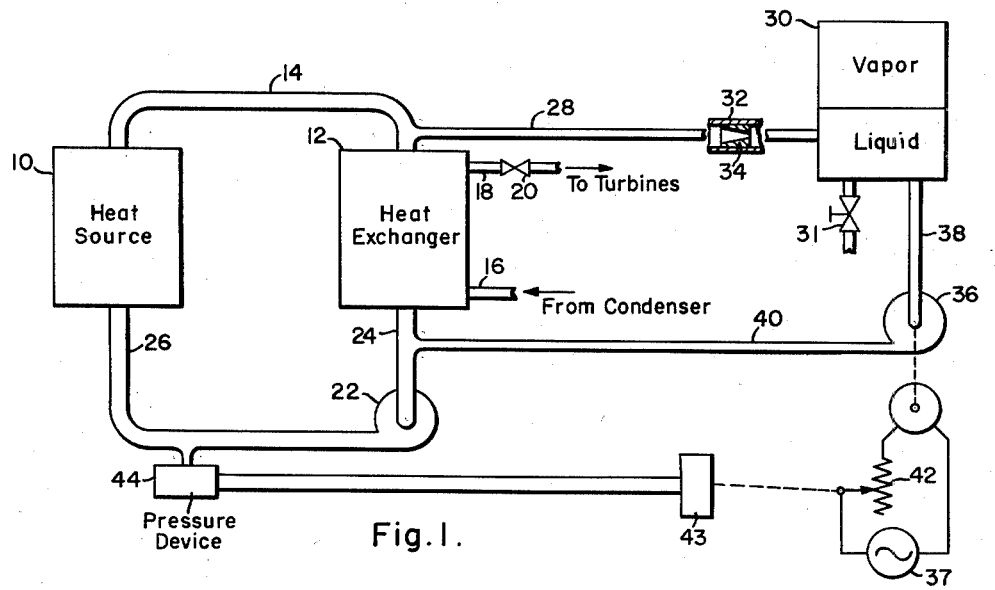
FIGURE 1 is a schematic view of a pressurized coolant system employing one embodiment of this invention.
Figure 2:
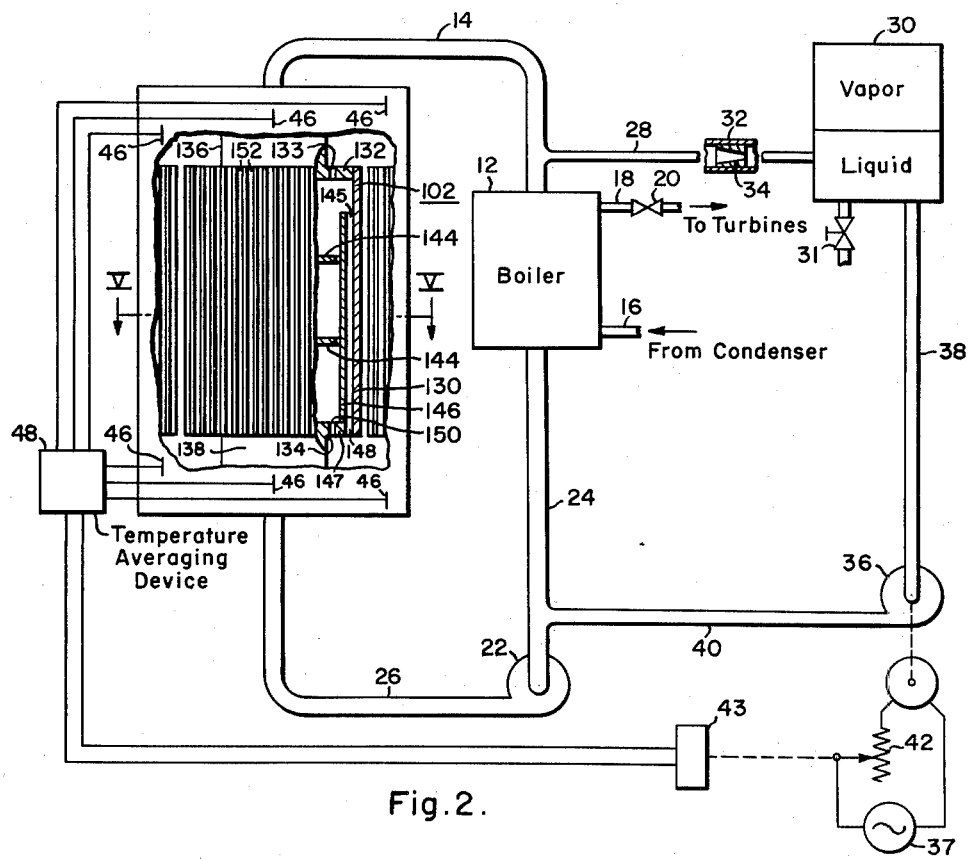
FIG. 2 is a schematic view of another pressurized coolant system employing another embodiment of the invention shown in FIG. 1 and showing an enlarged section of a fuel element having portions thereof cut away.
Figure 4:
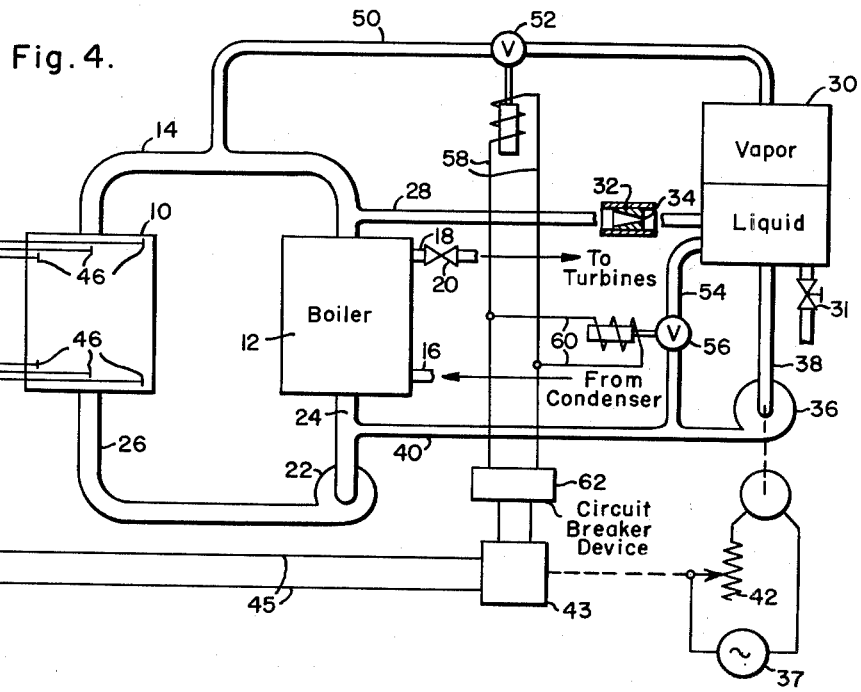
FIG. 4 is a schematic view of a pressurized coolant system employing a variation of the embodiment of the invention shown in FIG. 2.

The embodiments of this invention illustrated in FIGS. 1, 2 and 4 comprise generally a primary heat transfer system having a heat source, a heat exchanger or heat sink, and a main coolant pump connected in series therein. The primary system is provided with a coolant, such for example as water, biphenyl or other liquid having good heat capacity characteristics, which is recirculated therethrough by means of the main coolant pump and is heated by the heat source, and flows from the heat source to the heat exchanger to there transfer its heat energy to another coolant in a secondary portion of the heat exchanger. The primary system is maintained at a pressure higher than atmospheric by means of a bias flow system which causes a portion of the normal coolant flow into the heat exchanger to pass through a flow restriction means, such for example as an orifice, into a storage tank and then returns another portion of the coolant from the storage tank to the primary system by means of a variable speed pump connected between the storage tank and the output side of the heat exchanger so that the difference in flow out of the primary loop and into the primary loop is generally dependent upon the speed of rotation of the variable speed pump. The speed of the motor of the variable speed pump is governed by a signal from a pressure instrument located in the primary system.

It is to be noted that the certain embodiments of this invention generally describe the primary system of a pressurized liquid neutronic reactor, wherein the invention has certain particular features of cooperation and advantage. However, in its broader aspects, the invention relates to a primary system which includes any type of a heat source, a heat sink and a circulating pump connected in series, and is applicable generally to many types of pressurized systems, such for example as a pressurized hot water heating plant for a building in which a coal or oil fired boiler is the heat source, radiators comprise the heat sink, and water is the coolant which recirculates therebetween.

In the embodiment of the invention illustrated in FIG. 1, the primary system includes a heat source 10 provided in a pressure vessel constructed of a material having sufficient strength to withstand pressures of a high order, such for example as iron or iron alloys. Located within the pressure vessel is a means (not shown) for heating the primary system coolant, such for example as the core of a reactor. If a neutronic reactor core is employed as the heat source, this may comprise some fissionable material, such as highly enriched uranium dispersed in another metal to form fuel elements. The fissionable material during the fission process normally gives off fast neutrons, which are moderated to thermal velocities by a moderating material, such for example as graphite, water or a hydrogen bearing organic material, to cause additional fissions. Of course, the quantity and arrangement of the fuel is such that at least one thermal neutron from each fission will cause fission of another atom of the fuel so that a chain reaction will take place.

The primary loop is provided with a heat exchanger 12 whose input is connected to the output of the heat source 10 by means of the hot leg piping 14. The heat exchanger 12 may be any one of many such devices well known in the art, and is generally provided with a plurality of parallel tubes (not shown) which are commonly connected at one end to the hot leg piping 14. The tubes are in heat transfer relation with a coolant of the secondary system of the reactor plant in the heat exchanger. Secondary coolant flows to the heat exchanger from a condenser (not shown) through the condenser piping 16 and exits from the heat exchanger as a vapor through the turbine piping 18 which passes to the turbines (not shown) and whose flow rate is regulated by a turbine input valve 20. The primary coolant flows out of the primary system tubes of the heat exchanger 12 into the intake of a main coolant pump 22 through the cold leg piping 24. The main coolant pump 22 is generally a canned type of motor pump whose construction is well known in the art and whose function is to pump a liquid therethrough with a minimum of leakage in the pump. One pump which may be so employed in this system is that described and illustrated in application Serial No. 440,628 by Benjamin Cametti and Arthur C. Hagg, entitled "Totally Enclosed Canned Motor Pump," filed on July 1, 1954 and assigned to the same assignee as this invention. The coolant then passes from the main coolant pump outlet to the heat source 10 through the input piping 26 of the heat source 10.

It is generally known that the coolant of a reactor may also serve as a moderator for the reactor if the coolant contains a large hydrogen atom content. In the embodiment of the invention here described, the coolant-moderator may be light water, heavy water, or any suitable hydrogen-bearing organic liquid. The coolant acts as a heat exchange medium by picking up heat from the fuel elements of the heat source then being cooled by transferring its heat energy to the coolant of the secondary system in the heat exchanger 12.

As previously pointed out, reactors normally operate at temperatures above the boiling point of the coolant so that the primary system of a reactor must be maintained at a higher than atmospheric pressure to maintain the liquid state. To provide for such pressures, the primary system is hermetically sealed and is comprised of materials of sufficient strength to withstand the pressure therein, such for example as iron or an iron alloy. Pressure of the primary system is maintained by the bias flow system comprising this invention, whereby a portion of the hot leg flow passes from the hot leg piping 14 into the bias piping 28. The bias piping 28 is connected to a pressurized tank 30 through a flow restriction means 32. The restriction of flow may be accomplished by any means well known in the art, such for example as a nozzle 34, or other type of orifice in the bias piping 28, which provides an opening of smaller cross sectional area than the interior of the bias piping 28. The storage tank 30 merely comprises a completely sealed tank constructed of any suitable material capable of withstanding the pressure contained therein, such for example as iron or an iron alloy. The lower portion of the storage tank is directly connected to the intake of a bias pump 36 by means of the pressurizer output piping 38. The bias pump 36 may be the same type as described in the aforementioned Cametti and Hagg application but can be smaller in capacity than the main coolant pump 22. Flow from the outlet of the bias pump 36 to the cold leg piping 24 is provided by means of bias output piping 40 connected directly therebetween. The bias pump 36 is operated by a motor whose speed of rotation can be regulated by any well-known regulating means, for example as by the field controlling rheostat 42 connected in series between the electrical supply 37 and the motor. The value of the resistance of the rheostat 42 is varied by a signal from a pressure responsive device 44 communicating with the cold leg piping 26 of the primary loop. The pressure device 44 may be any one of many devices well known in the art and whose construction does not form a part of this invention, such for example as a Bourdon tube pressure device incorporating a variable electrical resistance to transmit an electrical signal which varies with the existing pressure. The electrical output of the pressure device 44 is connected to controller 43. The controller 43 may be one of many such devices well known in the art and whose construction does not form a part of this invention, such for example as an electromagnet device which operates functionally to vary the resistance of the rheostat 42 with the output signal from the pressure device 44.

In pressurized reactors of the Brennan and Grossman type, it is normally a basic requirement that the pressure of the primary loop be maintained at some constant value. It is notable that during steady state operations flow into the storage tank 30 due to operation of the pump 36 through the bias piping 28 and flow out of the storage tank 30 into the primary loop through the bias output piping 40 is continuously taking place.

Assuming the entire system is filled with liquid, flow to the storage tank is commenced initially by starting the bias pump 36 which creates a pressure difference between the storage tank and the primary system. The pump is operated until the desired operating pressure is built up in the primary system. A bleed valve 31 is provided at the bottom of the tank 30 so that a portion of the coolant in the storage tank can be removed therefrom, in order to provide a vapor space in the upper part of tank 30. Of course the orifice 34 is designed so that when the pump is operating at some constant speed at which the flow out of the primary loop is equal to the flow into the primary loop, there will be sufficient pressure drop as will permit flashing of a portion of the coolant to vapor. This situation exists only when the pressure received by the pressure device 44 remains at the desired operating value. In the case then of a sudden decrease in pressure in the primary system, the pressure device 44 will transmit a signal to a controller 43 which, in turn, will decrease the resistance of the rheostat 42 to increase the speed of rotation of the rotor of the bias pump 36. Such a variation in motor speed will increase the flow into the primary loop through the bias output piping 40 to a value greater than the flow out of the primary loop through the bias piping 28 to thus raise the pressure in the primary loop.

This flow difference will continue until the signal transmitted to the controller 43 by the pressure gauge 44 causes the controller 43 to operate rheostat 42 and reduce the pumping rate of the bias pump 36 to a steady state value. In the case of an increase in pressure above the desired value, the signal transmitted from the pressure device 44 to the controller 43 will cause the latter to increase the resistance of the rheostat 42 and reduce the speed of rotation of the motor of the bias pump 36 to such a value that the flow out of the primary loop through the bias piping 28 is greater than the return flow to the primary loop through the bias output piping 40 to thus reduce the primary loop pressure.

It is to be noted that the pressure of the coolant in the pressurizer tank 30 is less than the pressure in the primary system. This pressure difference is created by operating the bias pump 36. As long as the bias pump 36 is operating, the pressure difference is maintained. Flow to the storage tank 30 will therefore flash into a vapor-liquid mixture upon passing the orifice 32 creating a liquid-vapor phase in the storage tank 30. The storage tank is located above the bias pump 36 so that flashing in the bias pump 36 cannot take place unless the storage tank is empty. The placing of the pressurizer output piping 38 at the bottom of the storage tank 30 also aids in preventing bias pump flashing.

The bias pressurizing system inherently acts to maintain a constant pressure in the primary system. This inherent stability is obtained because the flow through an orifice is dependent upon the pressure difference across the orifice, and also because of the characteristics of the bias pump 36. FIG. 5 comprises a graph of pressure head versus percent full flow of the bias pump 36 for certain constant speeds of rotation thereof. From FIG. 5 it can be seen that for a constant pump speed, the coolant flow through the bias pump 36 varies inversely with the pressure head on the pump 36. Accordingly, if a sudden pressure increase occurs in the primary system, the pressure drop across the orifice 32 will increase causing the flow across the orifice to be increased. Such a flow increase will naturally tend to alleviate the pressure increase in the primary system. At the same time the increased pressure in the primary system increases the pressure head of the bias pump 36, and accordingly, the return flow to the primary system from the bias pump will decrease in accordance with FIG. 5. Such variations will diminish the return flow to the primary system through the bias output piping 40. It can therefore be seen that upon a pressure increase in the primary system, the storage tank input flow will increase, and the storage tank output flow will decrease so that the bias system will inherently act to decrease the primary system pressure to the steady state value.

For a decrease in pressure in the primary system, the pressure difference across the orifice 32 is decreased, causing the storage tank input flow to decrease. At the same time the pressure head of the pump 36 has also decreased, causing the outlet flow from the storage tank 30 to be increased. Since the bias system tends to restore equilibrium pressure in the primary system inherently, by proper choice of variation of pump flow to pressure head characteristics of the bias pump 36, and by proper sizing of the orifice 32, a system may be constructed where no variation of bias pump speed need take place to maintain an equilibrium pressure in the primary system.

Accordingly, the embodiment of the invention illustrated in FIG. 1 acts to inherently maintain the pressure of a closed system at a constant value for small variations in the system pressure. Where large fluctuations in the pressure of the system take place, an equilibrium pressure can be restored by varying the speed of rotation of the bias pump 36.

This invention also contemplates that the pressure of the primary system may also be varied by the employment of a constant speed bias pump 36 and varying the size of the flow restriction means 32 in accordance with a signal from the pressure device 44. Inasmuch as the flow restriction means 32 merely comprises an area restriction in the bias piping 28, such an area restriction may also be accomplished by a throttle valve located therein, as hereinafter described in connection with FIG. 4. The area restriction may thereby be varied in accordance with the pressure signal by varying the opening of the valve. It is also contemplated that the combination of a variable flow restriction means and a variable speed bias pump may be employed to provide pressure equilibrium.

Figure 3:
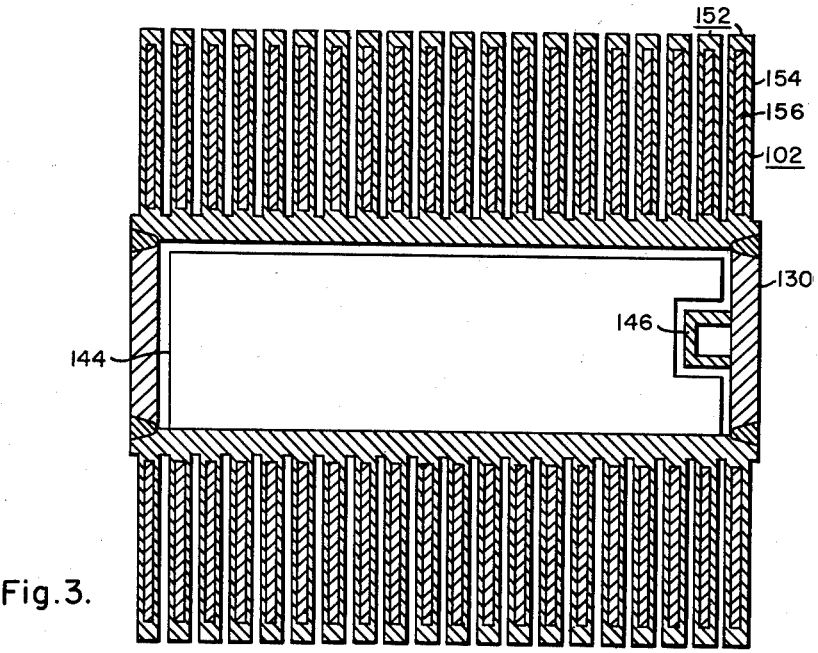
FIG. 3 is an enlarged, transverse sectional view of the fuel element shown in FIG. 2 taken along the line V—V thereof.

The embodiment of the invention illustrated in FIGS. 2 and 3 is similar in certain aspects to the system described in FIG. 1 with the exception of the type of heat source and control system used. Accordingly, like parts of FIGS. 2 and 3 will be designated with the same reference characters as FIG. 1. The heat source utilized in this embodiment of the invention is one described and illustrated in the aforementioned Roman application. The heat source 10 generally comprises a plurality of vertically mounted subassemblies 102 located in a pressure vessel. Each of the subassemblies 102 is held fixed in its position within the pressure vessel by means of upper and lower support members, not shown.

One of the individual fuel element subassemblies 102 may comprise a tubular center support 130, which may be fabricated from four flat plate members which are welded together to form a tubular member having a rectangular cross section as shown in FIG. 3. The material used in fabricating the tubular member 130 should have a low cross section for the absorption of thermal neutrons as well as high corrosion resistance, and it is preferably fabricated from zirconium or a zirconium alloy. The open ends of the tubular member 130 are closed by means of suitable end caps 132 and 134 which are attached to the tubular member by welding or the like. Each end cap has a suitable spacer 136 or 138 formed integral with it so that the upper and lower ends of the fuel element subassemblies 102 are spaced from the upper and lower supporting plates, not shown, of the pressure vessel. The spacers 136 and 138 may also be used for securing the subassemblies 102 to the support plates by some suitable means, such for example as by welding or by certain locking arrangements. The cap 132 is provided with a small vent opening 133 which allows gas to escape from the tubular member 130 when the reactor is filled with coolant. The vent 133 also allows the escape of gases dissolved in the coolant during operation of the reactor. However, the vent opening 133 should be sufficiently small in size so that the member is not freely vented but will restrict the escape of gas or vapor so that it will take a predetermined time for the escape of a given volume of gas or vapor. The interior of each tubular member 130 is provided with a series of horizontal baffles 144, also formed of zirconium or a zirconium alloy, which are spaced from the two end surfaces and one side surface of the tubular member 130 as shown in FIG. 3 and attached to the other side surface by any suitable means such as welding. Also mounted in the interior of the tubular member 130 is a channel-shaped steam vent 146 having a square cross section which terminates in an open end 145 which is spaced from the top of the end cap 132 and has its lower end 147 secured to the bottom end cap 134. Two small openings 148 and 150 are provided in the bottom end cap 147 so that the coolant may flow into the tubular member 130, and any vapor collecting in the upper part of tubular member 130 may pass downwardly and out of the tubular member 130 by means of the steam vent 146 and the opening 148, respectively. The individual fuel plates 152 are attached to the outer surface of the tubular member 130 on opposite sides by any desired means, such as welding. Each of the fuel plates 152 comprises an inner core 156, which contains the fuel, and an outer cladding 154. The fuel may be comprised of any fissionable material such for example as uranium isotopes 233 or 235 or plutonium isotope 239, which may also be combined in part with uranium 238 and certain impurities. In order that this fuel may be efficiently used in a reactor, it must be dispersed by some suitable means such as by alloying with another metal, such as zirconium, so that the complete fuel alloy will have a greater total volume and thus present sufficient surface so that the heat can be efficiently transferred from the fuel to the coolant when the fuel fissions. The cladding 154 may also be comprised of zirconium or a zirconium alloy. For specific amounts of fissionable material necessary to maintain a chain reaction and for the specific dimensions of a reactor comprising this type of fuel element, reference is again made to the Roman application.

In order to operate the reactor shown in FIGS. 2 and 3, it is first necessary to establish a flow of coolant through the reactor core. The coolant is preferably also the moderating material of the reactor and may comprise a liquid, such for example as light water, heavy water or any suitable hydrogenous liquid. This flow of coolant will fill the tubular members 130 of the subassemblies 102 by flowing through opening 150. Any air trapped in the tubular member 130 will be vented through opening 133. The reactor control rods, not shown, may then be withdrawn, and the fissioning of the fuel contained in the individual plates 152 will commence. As the chain reaction multiplies, the temperature of the individual plates will increase. As the temperature increases, part of the coolant, which fills the tubular member 130 of the individual fuel element subassemblies, will be converted into a vapor, since it is a stagnant volume, it will retain most of the heat transferred to it from the fuel plates, thus decreasing the average density of the coolant surrounding the reactor core. Of course, a small amount of vapor will escape through vent opening 133, but this will be a minor amount because of the small size of opening 133 relative to the rate at which vapor is formed. As the coolant temperature continues to increase, more of the coolant will be converted to a vapor, and the average density of the coolant will decrease further.

A point of equilibrium between the conversion of coolant to a vapor and the escape of vapor through opening 133 will be reached at a certain temperature, and the reactor will operate at this temperature. This point of equilibrium will depend upon the power demanded of the reactor, and at this point a portion of the volume of the tubular member 130 will be filled with a vapor of the coolant, and a portion will be filled with liquid coolant. For example, as the power demand increases, the average inlet temperature of the coolant to the reactor will decrease which, in turn, will decrease the temperature of the coolant surrounding the fuel element subassemblies. As the temperature of the coolant decreases, part of the vapor of the coolant contained in the tubular member 130 will be transformed into liquid coolant, thus increasing the average density of the coolant surrounding the fuel element subassemblies. As the average density of the coolant increases, more fission neutrons will be slowed down to thermal neutrons, thus increasing the reactivity of the reactor which, in turn, will raise the temperature of the individual fuel elements 152. As the temperature of the fuel elements 152 rises, the temperature of the coolant leaving the reactor will likewise rise, thus supplying the increased power demand required of the reactor. A point of equilibrium between the rising of the temperature of the fuel elements and the average density of the coolants surrounding the individual subassemblies will again be reached, and the reactor will operate at this temperature.

The above description has indicated the general theory of operation and the inherent control of a reactor of this type whereby the reactor itself will find an equilibrium operating condition, and it will operate about this equilibrium condition. For rapid changes in reactor load, this inherent control of the reactor is not sufficient and another type of control is necessitated.

For a steam rod type of reactor, it would be desirable to utilize the inherent steady state stability characteristics during rapid changes of power. Unfortunately during these rapid load changes the effect of the steam rods is diametric to the desired operating results, as for example, a rapid decrease in plant load results in a general increase in the average coolant temperature. The resulting coolant volumetric increase causes an increase in plant pressure which compresses the confined vapor and increases the reactivity. This effect causes an increase in the power output from the core when a decrease is desired. Similarly, an increase in plant load decreases plant pressure, and increases the volume of the confined vapor which decreases reactivity. The overall effect is to reduce core power output when an increase is desired. The pressurizer bias system causes the reactor to behave opposite to these inherent characteristics and thus behave in the manner required for successful operation. Adaptation of the present invention to this type of reactor will provide the control means for operating under these transient conditions.

For a constant temperature, the volume of the vapor present in the tubular member 130 will depend upon the pressure of the system. Accordingly, when the system pressure increases, the volume of the vapor will decrease and this causes the volume of the liquid to increase, which will result in an increase of the average density of the moderator. The increase in moderator density will increase the number of fissions taking place within the reactor and thereby cause the temperature of the coolant to increase. Conversely, a decrease in pressure will operate in an opposite manner so that upon such a pressure decrease, the volume of the confined vapor will increase causing the volume of the moderator contained in the interior of the tubular member 130 to decrease and result in a decrease in the average density of the moderator, thus decreasing the reactivity of the individual fuel elements 152.

Under steady state operating conditions, the temperature of the reactor inlet coolant is dependent upon the reactor load. Thus, for 100% load on the reactor, the inlet coolant will be at a lower temperature than for a 50% load on the reactor. Accordingly the average coolant temperature will be varied by the variations in the inlet coolant temperature and this will depend on the load. By maintenance of the average coolant temperature at a constant value independent of the load, the reactor is then operable at any load. However, the temperature increase of the coolant in passing through the reactor should be varied depending upon the reactor loading. By varying the pressure of the reactor system in accordance with the reactor load, coolant temperature variation may be varied to thus maintain a constant average coolant temperature.

To illustrate this control system, when the reactor load increases, the coolant pressure should be increased proportionately. Because of the high reactor load, the average temperature of the reactor coolant will be decreased, necessitating a greater temperature rise of the coolant when it passes through the subassemblies 102. This increased temperature rise is accomplished by increasing the pressure of the primary system which will increase the reactivity of the reactor and cause the desired temperature rise. To illustrate the control of this reactor when the load decreases, the pressure should be decreased proportionately. The average temperature of the coolant at the decreased reactor load is increased so that the necessary temperature rise of the coolant when it passes the reactor fuel elements 150 should be decreased. The decrease in this temperature rise is created by the decrease in primary system pressure in the manner previously described.

It is therefore to be noted that by maintaining the average coolant temperature of the reactor at a constant value, the reactor may be controlled by variation of the pressure of the primary system. A measurement of the average temperature of the coolant may be made by some suitable means, such for example as by thermocouples 46, located in the primary coolant adjacent the hot leg piping 14 and the input piping 26. The thermocouples 46 are displaced in the reactor and output signals from them are fed into a well known type of averaging circuit 48 which will compute an average value of the reactor outlet coolant. The construction of the temperature averaging circuit 48 may be one of many such averaging circuits well known in the art such, for example as a magnetic amplifier type of averaging circuit. The circuit 48 will operate functionally to take an output signal from each of the thermocouples 46 and average them to produce an output signal equivalent to such an average. This average signal is fed into the controller 43 which then operates the rheostat 42 in such a way as to increase or decrease the speed of rotation of the bias pump 36 inversely in accordance with this signal. Should the temperature from the averaging circuit 48 be less than the normal desired operating temperature of the reactor, the rheostat 42 is adjusted in such a way as to increase the pumping power of the bias pump 36. The increase in pumping power will result in a higher pressure in the primary section which will result in higher average coolant temperature therein. Should the signal from the averaging circuit 48 show that the average coolant temperature is greater than the desired value, the value of the resistance of the rheostat 42 will be varied to decrease the pumping power of bias pump 36 which will operate to decrease the primary system pressure and thereby result in a decrease in the reactor coolant temperature.

Thus, it may be seen that the pressurizer bias system may function to operate a reactor whose primary system pressure varies with load. Thus, any reactor whose primary system pressure varies with reactor load may be controlled by this invention. It is also notable that the thermocouples 46 need not be placed on both the hot and cold sides of the hot side reactor but may, if desired, be placed on either side thereof so that the reactor may be operated by maintaining either a constant outlet temperature or a constant inlet temperature.

It is also possible to control the reactor by varying the primary system pressure in accordance with load by varying the pump 36 with certain secondary side characteristics, such for example as by variation of the flow through the turbine input valve 20, or by the steam pressure on the secondary side. Pressure bias control of a reactor may be used as the sole means for controlling this type of reactor or may be used in combination with the inherent control maintained by this reactor. The control combination may be achieved by using inherent control during equilibrium conditions and pressure control during transient conditions.

The embodiment of the invention illustrated in FIG. 4 is similar in certain aspects to the system described in FIGS. 1 and 2 except for the bias pressurizing system. Accordingly, like parts of FIG. 4 will be designated with the same reference numerals as in FIGS. 1 and 2. For purposes of illustration only, the heat source 10 will be considered as including the steam rod type of reactor illustrated in FIGS. 2 and 3.

In this embodiment of the invention, control of primary system pressure surges which may result from sudden load changes is achieved, by providing a surge line 50 connected between the hot leg piping 14 and the storage tank 30 in parallel with the bias piping 28. The surge line 50 is provided with a surge valve 52 which is operable by a signal from a circuit breaker device 62 through lead 58. The surge valve 52 is preferably an electrically operable control valve, such for example as a solenoid control valve or a motor driven control valve whose construction is well known in the art and does not form a part of this invention. The bias output piping 40 is provided with a feedback line 54 which is connected to the pressurizer tank 30 and has a feedback valve 56 therein similar to the surge valve 52 and which is also operable by the circuit breaker device 62 through lead 60. The feedback line 54 is essentially in parallel with the pressurizer output piping 38.

By utilization of the surge line 50 and the feedback line 54, finer control of the heat source 10 may be achieved. The thermocouples 46, located in the reactor vessel are connected to the temperature averaging circuit 48 and the latter transmits a signal directly to the controller 43 by lead 45, the controller 43 is connected directly to the rheostat 42 and is also connected to the circuit breaker device 62 causing the former to be operated in accordance with the output of the temperature averaging circuit 43 and causing the latter to operate only when the temperature circuit output reaches a certain predetermined trigger value, substantially above the signal transmitted by the averaging circuit for normal operating temperature. The output of the circuit breaker device is connected directly to the valves 52 and 56 by leads 58 and 60, respectively. When the temperature circuit output reaches the trigger value, the circuit breaker device 62 opens the valves 52 and 56 until the temperature circuit output decreases below the trigger value. Therefore, in the case of a high pressure surge such that the temperature in the primary system increases so that the feedback valve 56 and the surge valve 52 are opened. The surge valve 52 and the feedback valve 56 are two position valves which are at either a full-open position or a full-closed position.

The provision of a surge line 50 and feedback line 54 merely operates to decrease the response time of the bias pressure system to primary system pressure surges. In order to obtain a fast recovery to operating pressures in the case of a surge in the primary system pressure, it is to be noted that when such a surge occurs, the average temperature of the primary coolant increases to the aforesaid predetermined value. The temperature averager 48 will receive the increased temperature signal from the thermocouples 46 and will transmit a corresponding voltage to the controller 43. The controller 43 will then operate the rheostat 42 to slow down the bias pump 36. When the average temperature signal reaches the trigger valve, the circuit breaker device 62 will operate to open valves 52 and 56. The circuit breaker device 62 may be one of many devices well known in the art which may operate at a predetermined voltage or current level to transmit a signal and cease to transmit the signal when the input voltage diminishes to a value below the predetermined level. The valves 52 and 56 are constructed so that when the signal from the circuit breaker device 62 is no longer transmitted, the valves 52 and 56 will close.

The opening of surge valve 52 allows primary coolant to flash into the storage tank 30 through surge line 50 which effectively removes fluid from the primary system at a faster rate, thereby reducing the primary system pressure. The opening of the feedback valve 56 acts to lessen the flow through the bias output piping 40 into the cold leg piping 24 by recirculating a portion of the normal bias outlet flow back into the storage tank 30 and the effect of the feedback is also to reduce the pressure in the primay system. When the pressure in the primary system decreases, the average coolant temperature decreases and shuts off the signal from the circuit breaker device 62 so that the surge valve 52 and feedback valve 56 automatically close. The system pressure is also being restored to operating values by means of normal operation of the bias pump 36 in a manner previously described. Accordingly, the embodiment of the invention shown in FIG. 4 provides a means for fast recovery from a high primary system pressure surge. The use of the surge line 50 and feedback line 54 in the embodiment of the invention shown in FIG. 1 is also possible, if use of a primary system operating at a constant pressure is desired by merely operating the controller 43 by a pressure device.

The surge valve 52 and feedback valve 56 may also be operated sequentially by providing a different trigger signal to each valve. The providing of different trigger signals may be accomplished by the provision of two circuit breaker devices in parallel, each operable at a different trigger value and each connected to one of the valves, respectively.

Since numerous changes may be made in the above-described construction and still different embodiments of this invention may be made without departing from the spirit and scope thereof, it is intended that all matter contained in the foregoing description or shown in the accompanying drawings shall be interpreted as illustrative and not in a limiting sense.

We claim as our invention:

1. A method of controlling the pressure in the primary coolant system of a nuclear power reactor having a fluid coolant under super-atmospheric pressure flowing in a closed primary coolant loop from a reactor heating zone through a hot portion of said loop to a primary coolant cooling zone, then to the reactor heating zone through a cold portion of said loop, which comprises tapping off a control portion of said coolant flow from said hot portion of said loop and transporting said portion of the coolant to a storage zone while restricting the flow thereof, and transporting said portion of the coolant from the storage zone to the cold portion of said loop and varying the flow rate of the control portion from the storage zone to the cold portion of the said loop in response to a pressure-temperature variable of the coolant in the primary loop.

2. A reactor pressurizer system having a pressurized primary heat transfer system containing a primary reactor coolant comprising a pressure vessel containing a liquid coolant inlet, a neutronic reactor core and a liquid coolant outlet, a hot leg conduit connecting said outlet with a heat exchanger means, a cold leg conduit containing a primary coolant pump, connecting said heat exchanger means with said coolant inlet, a bias flow system connecting said hot leg conduit and said cold leg conduit comprising an inlet bias conduit having a constriction, connecting said hot leg conduit to a pressurized bias tank having a liquid section and a vapor section, an outlet bias conduit connecting the liquid section of said bias tank with said cold leg conduit through a variable speed bias pump, and means for varying the speed of the bias pump responsive to a pressure-temperature variable of the primary coolant whereby a variation in primary coolant temperature in said primary heat transfer system causes a corresponding variation in primary coolant pressure by varying the flow of the coolant in the bias flow system.

3. The reactor pressurized system of claim 2 wherein the bias pump is responsive to a pressure variable of the primary coolant.

4. The reactor pressurizer system of claim 2 wherein the bias pump is responsive to a temperature variable of the primary coolant.

5. The apparatus of claim 2 having a surge conduit containing a normally closed surge valve connected between said hot leg conduit and said bias tank and in parallel with said inlet bias conduit, a feedback line containing a normally closed feedback valve connecting said bias tank and said outlet bias conduit in parallel with said variable speed pump, and means responsive to the temperature of the primary coolant in the pressure vessel for opening said feedback valve and said surge valve, whereby the pressure of the primary coolant is reduced in a primary heat transfer system.

References Cited in the file of this patent

UNITED STATES PATENTS 2,816,068   Ruano _____ Dec. 10, 1957

OTHER REFERENCES

Schultz: Control of Nuclear Reactors and Power Plants, McGraw-Hill Book Co., New York, 1955, pages 127, 130, 135.

MacPhee: Nucleonics, vol. 13 (December 1955), 42–45, 204/154.3.

Nucleonics, vol. 11 (June 1953), page 54.